(12) United States Patent
Lavan

(10) Patent No.: US 7,886,940 B2
(45) Date of Patent: Feb. 15, 2011

(54) STORAGE SYSTEM FOR FUEL CELL GASES

(75) Inventor: Charles K. Lavan, Medina, OH (US)

(73) Assignee: Lockheed Martin Corporation, Bethesda, MD (US)

( * ) Notice: Subject to any disclaimer, the term of this patent is extended or adjusted under 35 U.S.C. 154(b) by 663 days.

(21) Appl. No.: 11/493,668

(22) Filed: Jul. 25, 2006

(65) Prior Publication Data

US 2008/0023493 A1 Jan. 31, 2008

(51) Int. Cl.
*B67D 7/60* (2010.01)
*F17C 1/00* (2006.01)

(52) U.S. Cl. .................................. 222/386.5; 220/585

(58) Field of Classification Search ............. 222/386.5, 222/61, 94; 220/585, 586
See application file for complete search history.

(56) References Cited

U.S. PATENT DOCUMENTS

| | | | | |
|---|---|---|---|---|
| 339,885 A | * | 4/1886 | Hill | 138/148 |
| 2,507,778 A | * | 5/1950 | Frey | 220/585 |
| 2,962,195 A | * | 11/1960 | Greenlee | 222/394 |
| 3,282,459 A | * | 11/1966 | Wilson | 220/585 |
| 3,780,900 A | * | 12/1973 | Yamamoto | 220/560.08 |
| 4,228,759 A | * | 10/1980 | Shinozuka | 114/342 |
| 5,518,140 A | * | 5/1996 | Lenz et al. | 220/584 |
| 2003/0129464 A1 | | 7/2003 | Becerra et al. | 429/25 |
| 2003/0157395 A1 | | 8/2003 | Ren et al. | 429/44 |
| 2004/0072040 A1 | | 4/2004 | Duffy et al. | 429/21 |
| 2005/0116190 A1 | | 6/2005 | Adams et al. | 251/144 |
| 2006/0008687 A1 | | 1/2006 | Kaye et al. | 429/20 |
| 2006/0137332 A1 | | 6/2006 | Allgeier et al. | 60/298 |
| 2007/0077463 A1 | | 4/2007 | Adams et al. | 429/13 |

FOREIGN PATENT DOCUMENTS

WO  WO 2007/044424 A2  4/2007

* cited by examiner

*Primary Examiner*—Kenneth Bomberg
*Assistant Examiner*—Daniel R Shearer
(74) *Attorney, Agent, or Firm*—Renner Kenner Greive Bobak Taylor & Weber

(57) ABSTRACT

The present invention relates to a system and method for improving the efficiency of fuel cells. The storage system includes an outer shell and at least one bladder positioned inside the outer shell. A primary chamber is defined between the outer shell and the bladder, and a secondary chamber is defined interior to the bladder.

9 Claims, 2 Drawing Sheets

STORAGE SYSTEM FOR FUEL CELL GASES

TECHNICAL FIELD

The present invention relates to fuel cells. More particularly the present invention relates to fuel cells with improved reactant storage efficiency.

BACKGROUND ART

As environmental concerns come to the forefront in society, federal regulations require each generation of automobile to be more environmentally friendly than the previous. In striving to adhere to these regulations, automobile manufacturers are turning to alternative fuel vehicles that use cleaner fuels. Particularly, in recent years, auto manufacturers have looked to hydrogen-powered vehicles as an alternative to traditional gasoline powered vehicles. However, as with any new technology, hydrogen-powered vehicles have numerous challenges before they are commercially feasible. A chief concern is the efficiency of the fuel cells.

For example, a century of gasoline-powered vehicles has resulted in the public expecting cars and light trucks that travel at least 300 miles between fuel stops. Meeting that baseline target with hydrogen-powered vehicles has been difficult because hydrogen lacks the storage energy density efficiency of gasoline, given similar volumes. One kilogram of hydrogen contains the energy equivalent of a gallon of regular unleaded gasoline—a fact that is forcing automakers to search for new solutions for carrying hydrogen aboard vehicles. Therefore, to allow vehicles to travel sufficient distances to meet customer expectations, auto manufacturers are seeking to compress larger amounts of hydrogen in smaller tanks. Without sufficiently high pressures of hydrogen, hydrogen-powered vehicles are unable to obtain efficiencies to make hydrogen-powered vehicles a marketplace reality. While one might attempt to realize these efficiencies with existing tanks, such an attempt would be unsafe because the high pressure may cause these tanks to explode. Thus, because of the significant challenges involved, even the slightest increase in efficiency is a valuable contribution.

Recent advances in hydrogen-storage tanks have yielded elaborate tanks with an outer shell that includes several layers. While these storage tanks allow higher pressures than traditional steel tanks, these tanks are expensive. In addition, these tanks must be constrained to a cylindrical shape, and are likely unable to be molded into the tight, non-cylindrical confines of a vehicle's structure.

Therefore, a need exists for a hydrogen tank that can safely store high-pressure hydrogen and that may be compatible with present and future hydrogen-storage tanks. Such a hydrogen tank becomes an enabling technology for any regenerative power systems based on fuel cells. Such a tank is also useful in storing oxidizers.

SUMMARY OF THE INVENTION

In light of the foregoing, it is a first aspect of the present invention to provide an improved storage system for fuel cell gases.

It is another aspect of the present invention to provide a storage system that includes an outer shell and a bladder positioned inside the outer shell. The outer shell and the bladder define a primary chamber, and the bladder defines a secondary chamber that exists within the bladder.

It is yet another aspect of the present invention to provide a storage system that includes an outer shell and a plurality of bladders positioned inside the outer shell. The outer shell and an outermost bladder define a primary chamber therebetween, and each bladder has an interior that defines a corresponding secondary chamber.

It is still another aspect of the present invention to provide a method of storing a fluid. This method includes positioning at least one bladder in an outer shell such that the bladder creates a plurality of chambers within the outer shell, pressurizing one of the plurality of chambers to a baseline pressure, and pressurizing one of the other plurality of chambers to an elevated pressure that is greater than the baseline pressure.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
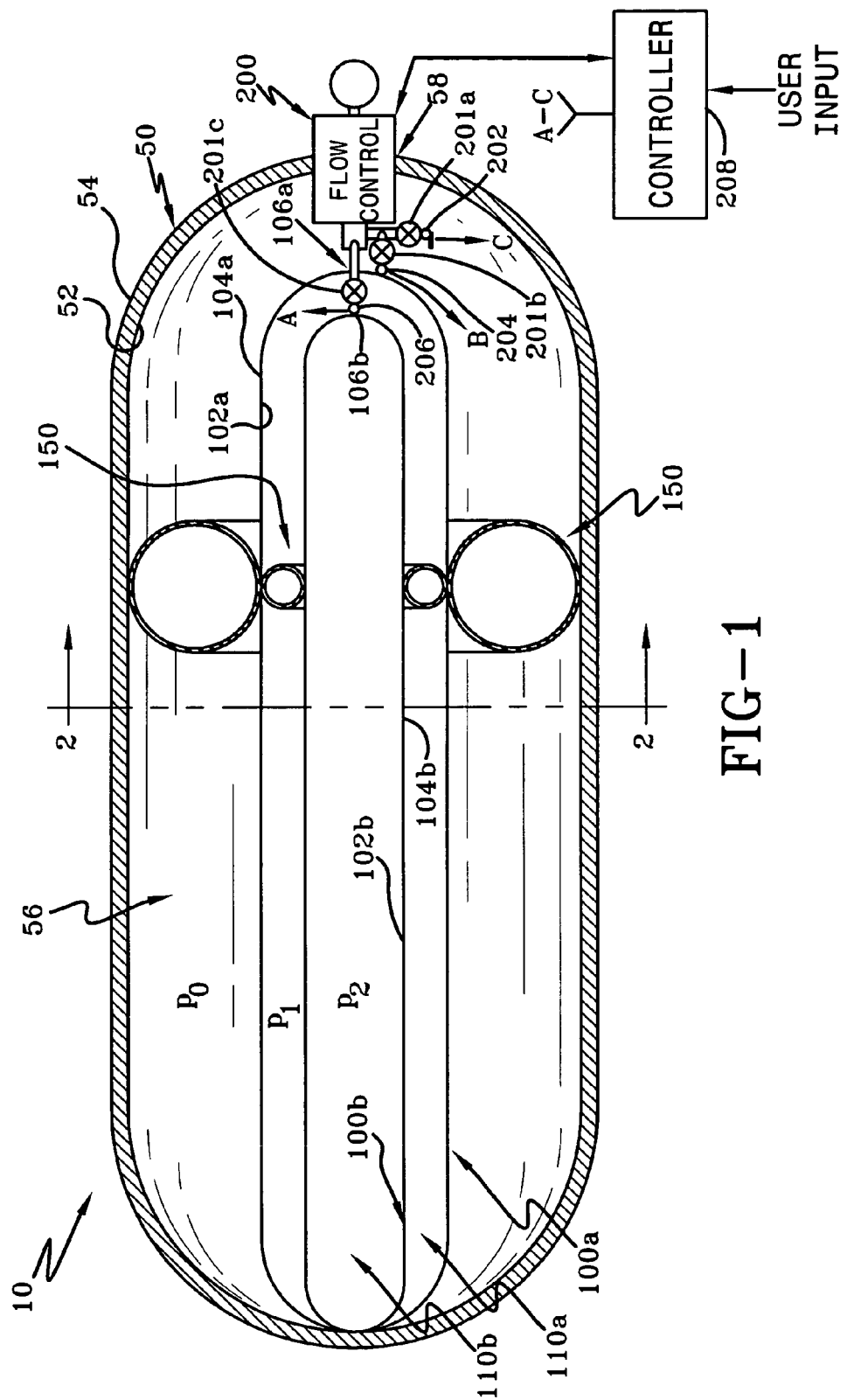
FIG. 1 is a cross-sectional elevational view of the storage system of the present invention.

As shown in FIG. 1, a storage system of the present concept is generally designated by the numeral 10. The storage system generally includes: an outer shell 50; a plurality of bladders 100 positioned inside the outer shell 50; a plurality of supports 150, each support 150 positioned adjacent to one or more bladders 100; and a flow control assembly 200 that intersects the outer shell 50 and that disposes fluid into and out of the outer shell 50 and the plurality of concentric bladders 100.

As used in this specification, the term "fluid" includes gases, liquids, or amorphous substances that tend to flow and conform to the outline of their container; or a combination of these elements. The term "fluid" may also include a vacuum. In various embodiments, the term fluid may include fluids that are fuel sources. In particular embodiments, the term "fluid" may include: hydrogen, methane, natural gas, oxygen, liquefied natural gas or combinations thereof.

As used in this specification, the term "concentric" indicates only that adjacent walls associated with the bladders are one inside the other. While in various embodiments "concentric" may include walls that have a common central axis; other embodiments are not so limited.

Typically, the outer shell and an outermost bladder are concentric, and a primary chamber is defined therebetween. This primary chamber contains a fluid at a base pressure $P_0$. The plurality of bladders are also concentric, and a series of secondary chambers are defined between the plurality of adjacent bladders, each chamber defined between two adjacent bladders. Each bladder may retain a relatively high pressure fluid, the high pressure relative to the pressure directly outside of the bladder. Each bladder can withstand the stress associated with the pressure difference between a relatively high internal pressure and a relatively low external pressure. Therefore, because the stress of the storage system is based on differential pressure rather than absolute pressure, the use of concentric bladders can increase the storage efficiency of existing storage tanks. In other words, the differential pressures allow the storage system to retain more fluid mass than would otherwise be possible with a single outer shell of the same size.

The storage system's outer shell 50 includes an inner surface 52 and an outer surface 54, between which a thickness is defined. The inner surface 52 of the outer shell 50 defines the outer region of a primary chamber 56. The outer shell 50 may take various shapes and in general may include any shape that can store a fluid having a pressure. In various embodiments, the outer shell 50 is cylindrically shaped. In other embodiments, the outer shell may be designed so as to fit into the tight, non-cylindrical confines of a vehicle's structure.

The inner surface 52 and the outer surface 54 may run parallel or substantially parallel and may adjoin at a region 58 near the flow control assembly 200. The inner surface 52 is generally a smooth, continuous surface that defines the outer boundary of a primary chamber 56. Although the outer surface 54 may include indicia or other elements which are die-stamped, painted, molded, affixed, imprinted, or otherwise present; the outer surface 54 is generally a smooth, continuous surface and generally defines the exterior of the outer shell 50.

The outer shell 50 may include one or more layers. For example, in a particular embodiment, the outer shell 50 may comprise a single layer of metal, alloy, foam, carbon composite, polymer, or other rigid material; a single layer may also be a filament wound structural tank. Examples of material that may be used in a single layer outer shell include: steel, iron, aluminum, stainless steel, carbon composite, polymer-matrix composite, polymer liner, nylon, foam, or any other number or combination of such materials. In various other embodiments, the outer shell may comprise more than one layer which may include, but is not limited to, any combination of the aforementioned layers and/or materials known in the art.

One or more bladders 100 may be concentrically positioned inside the outer shell 50. An alphabetic suffix is used to identify specific bladders. For example, the bladder 100a is received within the shell 50, and the bladder 100b is received within the bladder 100a. Although two bladders are shown, one bladder or more than two bladders could be utilized within the shell. Each bladder 100 includes a wall which has an inner surface 102 and an outer surface 104, between which a thickness is defined. Each bladder 100 retains a fluid, the fluid exerting a pressure on the inner surface 102 of the bladder 100. In various embodiments, each bladder 100 may be able to retain an interior pressure that differs from the surrounding pressure by about 100 psi to about 500 psi. In other words, each bladder may withstand a differential pressure of about 100 psi to about 500 psi. In a particular embodiment, each bladder may retain an interior pressure that is greater than the surrounding pressure by about 100 to 500 psig.

The inner surface 102 and the outer surface 104 of each concentric bladder 100 may run parallel, or substantially parallel, with each other. The inner surface 102 is generally a smooth, continuous surface. Similarly, the outer surface 104 is generally a smooth, continuous surface. The inner surface 102 and outer surface 104 may join at a region 106 near the flow control assembly 200 or at another region where the fluid enters each concentric bladder 50. Ideally, each bladder is made of the same material, but they could be made from different materials.

Each bladder 100 may include one or more layers. In various embodiments, each bladder 100 will include only a single, flexible, thin layer. Each concentric bladder may have a thickness needed to store the desired fluid at the appropriate differential pressure. Or each bladder 100 may be made of various materials. In various embodiments, each bladder 100 may comprise a lightweight material which is chosen to maximize the efficiency of the storage system. The efficiency of the storage system will be determined by:

$$\text{Efficiency} = F_{WeightFluid} / (F_{WeightFluid} + F_{WeightTank}) \quad (1)$$

In other words, the efficiency is proportional to the weight of the fluid in a tank, also referred to as the outer shell, divided by the sum of the weight of fluid in the tank plus the weight of the tank itself. In effect, if the weight of the fluid that is stored in the system increases faster than the total weight of the tank (including the fluid and the bladders), the efficiency of the storage system will increase. To this end, if the bladders 100 can store fluid at an increased pressure and the increase in fluid weight is greater than the weight of the bladder itself, the bladder will provide an increase in efficiency.

In various embodiments, the bladders 100 may comprise a form of nylon with a very high strength. In a particular embodiment the concentric bladders 100 may comprise Zylon™. Other materials that may be used for the concentric bladders 100 may comprise, but are not limited to polymer-matrix composites including carbon-based systems, or combinations thereof.

Each bladder 100 may have various shapes. Because the bladders may be flexible, the shape of each bladder may also change as its internal pressure changes. In typical embodiments, the shape of each bladder will largely correspond to the shape of the outer shell. In various embodiments, each bladder 100 is concentric with respect to the outer shell 50. In various embodiments, each bladder 100 is cylindrically shaped. Although the aforementioned shapes are typical, in general each bladder may have any shape that allows the bladder to store a fluid at a pressure.

A series of chambers are disposed about the interior of the outer shell 50. A primary chamber 56 and at least one secondary chamber 110 may be present. The primary chamber 56 extends between the outer shell's inner surface 52 and the outer surface of an outermost bladder. A first fluid in the primary chamber 56 exerts a first pressure $P_0$ against the outer shell's inner surface 52 as well as against an outer surface of an outermost bladder. The primary chamber 56 is typically sealed and/or distinct from the secondary chamber(s) 110 and from the environment outside the system. Thus, the primary chamber 56 may contain a fluid at a pressure that differs from the pressure of the other chambers.

The present concept includes a plurality of bladders, each bladder 100 having a corresponding secondary chamber 110. Each secondary chamber 110 exists between an outer bladder's inner surface and an adjacent inner bladder's outer surface. An alphabetical suffix is used to identify specific chambers. For example, secondary chamber 10a corresponds to bladder 100a. Secondary chamber 110b corresponds to bladder 100b.

Each secondary chamber 110 is typically sealed and distinct from the primary chamber 56 and from the other secondary chambers. In this way, each secondary chamber 110 may be isolated from the other chambers and each secondary chamber 110 may contain a fluid that has a distinct pressure that is different from the other chambers.

A fluid in each secondary chamber 110 exerts a pressure. In various embodiments, the fluid in each secondary chamber 110 may comprise the same fluid and may be the same fluid in the primary chamber 56. In other various embodiments, the fluid in one secondary chamber may differ from the fluid in other secondary chambers, and/or may differ from the fluid in the primary chamber. In other words, each chamber may store the same fluid, or each chamber may store a different fluid.

One or a plurality of supports 150 may be disposed in the outer shell, each support 150 positioned adjacent to one or more bladders 100. One or more supports 150 may be disposed in the primary chamber 56. One or more appropriately sized supports 150 may also be disposed about each secondary chamber 110. In various embodiments, the supports 150 are aligned about a common axis.

The supports 150 provide greater stability and allow the bladders 100 to withstand greater pressure deviations between adjacent chambers. The supports may be made of reactant compatible polymeric materials like high strength polymeric fibers such as isopoly, p-phenylene benzobisoxazole (PBO), or other carbon based polymeric composites. PBO is manufactured by TOYOBO in Japan and is sold under the trade name Zylon.

In various embodiments, each support 150 may have various shapes. For example, in a particular embodiment, the supports 150 are ring-shaped. The supports may be any other shape which is adapted to conform to the adjacent chambers.

In various embodiments, the supports 150 may be inflatable. In other words, the supports 150 may be hollow structures filled with a fluid. By utilizing a hollow structure, the supports may be lightweight and may thus further improve the efficiency of storage system.

Figure 2:
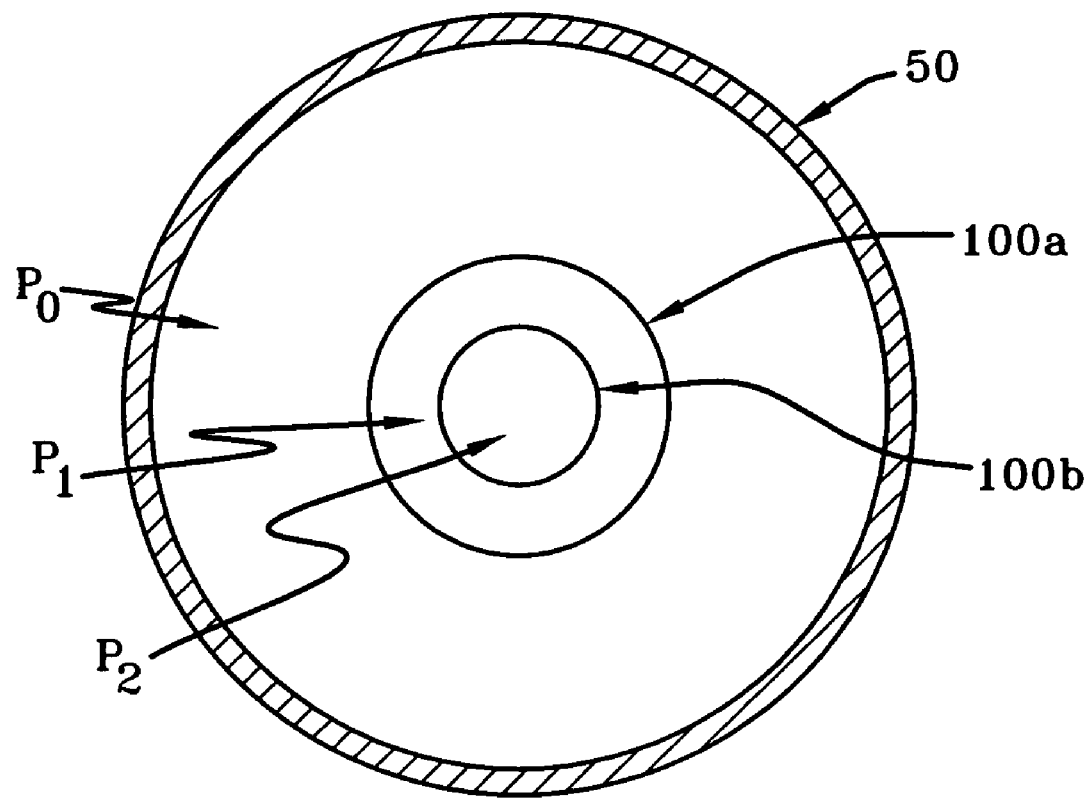
FIG. 2 is a cross-sectional view of the storage system taken along line 2-2 of FIG. 1.

As previously noted, each chamber may have a pressure that is different from the pressure of the other chambers. For example, as shown in FIG. 2, each chamber has a corresponding pressure $P_0$, $P_1$ and $P_2$. The primary chamber has a pressure, $P_0$, which is greater than the external pressure. The next chamber has a pressure, $P_1$, which is greater than pressure $P_0$. The next chamber has a pressure, $P_2$, which is greater than both $P_0$ and $P_1$. In short, $P_2 > P_1 > P_0$. By using a plurality of bladders (each of which supports a pressure differential), the system can store an increased mass of fluid.

Referring again to FIG. 1, the flow control assembly 200 provides a device for adding and withdrawing fluid to the various chambers such that different pressures may exist in each chamber. The flow control assembly 200 includes a series of valves 201, each valve 201a, 201b, 201c, etc., corresponding to a respective chamber.

In using the system 10, one may find it advantageous to position at least one bladder 100 in the outer shell 50 such that the bladders 100 create a plurality of chambers within the outer shell 50; pressurize at least a first chamber to a baseline pressure; and pressurize a second chamber to an elevated pressure that is greater than the baseline pressure. It may also be useful to position at least one support 150 in the outer shell, each support 150 often being directly adjacent to a bladder 100.

In various embodiments, the system 10 may include sensors 202, 204 and 206 that sense a pressure in at least one of the plurality of chambers. The system 10 may then utilize this sensed pressure to control the pressurizing of the first chamber to the baseline pressure, or to control the pressurizing of the second chamber to an elevated pressure, or a combination thereof. In various embodiments, at least one sensor may present in each chamber and/or with each valve 201. In other embodiments, at least one sensor may be present in a portion of the flow control assembly 200, each sensor corresponding to each chamber. For example, in FIG. 1, sensors 202, 204 and 206 correspond to the outmost chamber, the middle chamber, and the innermost chamber, respectively.

A broad spectrum of sensors may be utilized to measure the pressure. Some of these sensors may include, but are not limited to: fuel pressure gauges, digital fuel pressure gauges, oil pressure gauges, water pressure gauges, air pressure gauges, digital air pressure gauges, vacuum pressure gauges, hydraulic pressure gauges, liquid filled pressure gauges, differential pressure gauges, absolute pressure gauges, digital pressure gauges and low pressure gauges. Such pressure sensors may indirectly measure the pressure by monitoring of other variables such as temperature. The pressure sensors may be configured to provide electrical output of indicated pressure.

In other various embodiments, the system 10 may include a microprocessor to control the flow of fluid into the plurality of chambers. In these embodiments, a microcontroller 208 is connected to the flow control assembly 200 and associated pump (or other devices for controlling the fluid flow) so as to control the time and rate of fluid flow into various chambers and to pressurize the first chamber to a first pressure and to pressurize the second pressure to an elevated pressure. In these embodiments, pressure sensors may or may not be present.

The system 10 may also include a user-interface or other interface that provides for access and/or control of the various pressures. In various embodiments, this user-interface may be integrated into an automobile or monitored over a network. The microcontroller 208 provides the necessary hardware, software and memory to control any valves, pump or associated mechanisms associated with the flow control assembly 200. Indeed, the controller may receive input from the various sensors 202, 204 and 206 to facilitate use of the storage system 10.

By way of example only, the system 10 may include an embodiment where the outer shell houses two concentric bladders, each bladder capable of retaining an interior pressure that is 1000 PSI greater than the surrounding pressure external to the bladder. In such an embodiment, if the outer shell can retain a baseline pressure of 5000 PSI, then a pressure of 6000 PSI could be retained in the outermost bladder, and a pressure of 7000 PSI could be retained in the innermost bladder.

Thus, it should be evident that the system and method relating to an improved storage system for fuel cells constitutes an advantageous contribution to the art. Such a system and method can safely store high-pressure hydrogen and may be compatible with present and future hydrogen-storage tanks. Such a hydrogen tank becomes an enabling technology for any regenerative power systems based on fuel cells and can also be applied to oxidizer storage.

As will be apparent to persons skilled in the art, modifications can be made to the preferred embodiments disclosed herein without departing from the spirit of the invention, the scope of the invention herein being limited solely by the scope of the attached claims.

What is claimed is:

1. A storage system, comprising:
    a rigid outer shell;
    a plurality of concentric flexible bladders positioned inside the outer shell, wherein the rigid outer shell and the outermost flexible bladder define a primary chamber therebetween;
    a plurality of supports, wherein one of said supports is disposed between said rigid outer shell and an outermost flexible bladder in said primary chamber and adapted to conform therewith, and wherein the other of said supports are disposed between an interior of one said flexible bladder and an exterior of an adjacent said flexible bladder;
    each flexible bladder having an interior that defines a corresponding secondary chamber:
    each primary and secondary chamber containing a fluid;

the fluid within the primary chamber being maintained at a baseline pressure and the fluid within each secondary chamber being maintained at a pressure that is greater than said baseline pressure;

the pressure of the fluid within the secondary chambers increases between each secondary chamber from an outermost chamber to an innermost chamber.

2. The storage system according to claim 1, further comprising:

a flow control assembly to add and withdraw a first fluid to and from said primary chamber and a second fluid to and from said secondary chamber.

3. The storage system of claim 1, wherein the first fluid and second fluid may have the same compositions or different compositions.

4. The storage system of claim 3, wherein said flow control assembly comprises:

at least one valve in fluid communication with each of said chambers.

5. The storage system of claim 3, further comprising:

a controller connected to said flow control assembly, said controller receiving user input to facilitate adding and withdrawing of fluid from said chambers.

6. The storage system of claim 5, further comprising:

at least one sensor coupled to said flow control assembly and generating sensor input received by said controller to facilitate adding and withdrawing of fluid from said chambers.

7. The storage system according to claim 1, wherein said at least one support allows said flexible bladder to withstand greater pressure deviation between adjacent chambers.

8. The storage system according to claim 7, wherein said flexible bladder retains an interior pressure that differs from the surrounding pressure by at least 100 psi.

9. The storage system according to claim 1, wherein at least one of said plurality of supports is an inflatable hollow structure.

* * * * *